US009641025B2

(12) United States Patent
Agrawal et al.

(10) Patent No.: US 9,641,025 B2
(45) Date of Patent: May 2, 2017

(54) METHOD AND APPARATUS OF MASTER SELECTION LOGIC IN UPS PARALLEL SYSTEM (75) Inventors: Mahima Agrawal, Bangalore (IN); Suresh Kayanadath, Whitefield (IN); Joy George, Marathahalli Post (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 439 days.

(21) Appl. No.: 14/352,933

(22) PCT Filed: Oct. 21, 2011

(86) PCT No.: PCT/US2011/057196
§ 371 (c)(1),
(2), (4) Date: Apr. 18, 2014

(87) PCT Pub. No.: WO2013/058759
PCT Pub. Date: Apr. 25, 2013

(65) Prior Publication Data
US 2015/0022002 A1    Jan. 22, 2015

(51) Int. Cl.
*H02J 9/06* (2006.01)
(52) U.S. Cl.
CPC ............ *H02J 9/061* (2013.01); *H02J 9/06* (2013.01); *Y10T 307/62* (2015.04)
(58) Field of Classification Search
CPC .... H02J 9/06; H02J 9/061; H02J 9/062; H02J 2009/0068; Y10T 307/62; Y10T 307/615; H02M 7/493; G06F 13/4291; G06F 13/4286; G06F 2213/0052
See application file for complete search history.

(56) References Cited

U.S. PATENT DOCUMENTS 6,396,170 B1    5/2002    Laufenberg et al.
8,552,589 B2 *  10/2013   Ghosh ............... H02J 9/062
                                              307/64
2005/0041445 A1  2/2005   Zhou
2005/0043859 A1  2/2005   Tsai et al.
(Continued)

FOREIGN PATENT DOCUMENTS

CN      1430324 A      7/2003
CN      101533380 A    9/2009

OTHER PUBLICATIONS

Australian Patent Examination Report from corresponding Australian Patent Application No. 2011379368 issued Apr. 18, 2016.
(Continued)

*Primary Examiner* — Ryan Johnson
(74) *Attorney, Agent, or Firm* — Lando & Anastasi, LLP (57) ABSTRACT

According to one aspect, embodiments of the invention provide a method of operating a UPS system having a plurality of UPS's, the method comprising powering on the UPS system, assigning each one of the plurality of UPS's a unique identifier, calculating a master priority index for each one of the plurality of UPS's based on the unique identifier of each one of the plurality of UPS's, and based on the master priority index of each one of the plurality of UPS's, configuring each one of the plurality of UPS's to operate in one of a master mode of operation and a controlled mode of operation.

21 Claims, 8 Drawing Sheets (56) References Cited

U.S. PATENT DOCUMENTS

2009/0234998 A1  9/2009 Kuo
2012/0235480 A1* 9/2012 Kim ...................... H02J 9/062
                                                         307/18

OTHER PUBLICATIONS

International Search Report from corresponding PCT/US2011/057196 mailed Jul. 16, 2012.

* cited by examiner

METHOD AND APPARATUS OF MASTER SELECTION LOGIC IN UPS PARALLEL SYSTEM

This application is a National Stage Application under 35 U.S.C. §371 from PCT/US2011/057196, filed Oct. 21, 2011, which is hereby incorporated by reference in its entirety for all purposes.

BACKGROUND OF INVENTION

Field of the Invention

At least one example in accordance with the present invention relates generally to the parallel control of Uninterruptible Power Supplies.

Discussion of Related Art

Uninterruptible Power Supplies (UPS) are commonly used to provide regulated, uninterrupted power for sensitive and/or critical loads. There is an increased desire for UPS systems to provide greater capacity and/or reliability. For example, to provide enhanced scalability and/or redundancy, two or more UPS's may be electrically connected to form a single parallel UPS system with one output. In such a system, the combination of UPS's may provide increased power capacity to a load attached to the parallel UPS system. Also, if a first one of the UPS's coupled in parallel fails, the second one of the UPS's coupled in parallel may backup for the failed UPS.

SUMMARY OF THE INVENTION

Aspects in accord with the present invention are directed to a method of operating a UPS system having a plurality of UPS's. According to one aspect, the method comprises powering on the UPS system, assigning each one of the plurality of UPS's a unique identifier, calculating a master priority index for each one of the plurality of UPS's based on the unique identifier of each one of the plurality of UPS's, and based on the master priority index of each one of the plurality of UPS's, configuring each one of the plurality of UPS's to operate in one of a master mode of operation and a controlled mode of operation. According to one embodiment, assigning includes assigning a unique identifier to each one of the plurality of UPS's based on a CAN bus address of each one of the plurality of UPS's.

According to one embodiment, the method further comprises sensing whether any one of the plurality UPS's is operating in the master mode of operation, and in response to sensing that no UPS is operating in the master mode of operation, determining which one of the plurality of UPS's should be configured to operate in the master mode of operation. In one embodiment, the act of determining which one of the plurality of UPS's should be configured to operate in the master mode of operation comprises determining whether a first UPS of the plurality of UPS's is capable of operating in the master mode of operation, and in response to a determination that the first UPS is not capable of operating in the master mode of operation, sending a pulse signal from the first UPS to each one of the plurality of UPS's indicating that the first UPS has failed.

According to another embodiment, the method further comprises receiving at least one pulse signal at each one of the plurality of UPS's, counting a number of received pulse signals, and determining, based on the number of received pulse signals and the master priority index of each one of the plurality of UPS's, which one of the plurality of UPS's should be designated as master UPS. In one embodiment, the method further comprises determining, based on the number of received pulse signals and the master priority index of a second UPS, that the second UPS should be designated as master UPS, determining whether the second UPS is capable of operating in the master mode of operation, in response to a determination that the second UPS is capable of operating in the master mode of operation, configuring the second UPS to operate in the master mode of operation, and in response to a determination that the second UPS is not capable of operating in the master mode of operation, sending a pulse signal from the second UPS to each one of the plurality of UPS's indicating that the second UPS has failed.

According to another embodiment, determining which one of the plurality of UPS's should be configured to operate in the master mode of operation comprises assigning a delay time, based on the master priority index of each UPS, to each one of the plurality of UPS's, incrementing a value of a counter in each one of the UPS's upon sensing that no UPS is configured to operate in the master mode of operation, sensing, at a first UPS, that the value of the first UPS's counter matches its assigned delay time, and configuring, in response to sensing that the value of the first UPS's counter matches its assigned delay time, the first UPS to operate in the master mode of operation.

According to another aspect, the present invention features a UPS comprising an input configured to receive input power from an input power source, an output configured to provide output power to a load, a plurality of digital I/O's, and control circuitry coupled to the plurality of digital I/O's, the control circuitry configured to assign a unique identifier to the UPS, to calculate a master priority index of the UPS based on the unique identifier, and based on the master priority index and at least one signal provided by the plurality of digital I/O's, to configure the UPS to operate in one of a master and controlled mode of operation. In one embodiment, the control circuitry is further configured to be coupled to a CAN bus, and wherein the unique identifier assigned to the UPS is based on a CAN address of the UPS.

According to one embodiment, a first one of the plurality of digital I/O's is configured to be coupled to a master bus and to receive signals from the master bus indicating whether another UPS coupled to the master bus is operating in the master mode of operation. In another embodiment, a second one of the plurality of digital I/O's is configured to be coupled to the master bus and to provide signals to the bus indicating whether the UPS is operating in the master mode of operation. In one embodiment, in response to receiving signals at the first one of the plurality of digital I/O's indicating that no UPS coupled to the master bus is operating in the master mode of operation, the control circuitry is further configured to determine, based on signals received from the plurality of digital I/O's and its master priority index, whether the UPS should be configured to operate in the master mode of operation.

According to another embodiment, a third one of the plurality of digital I/O's is configured to be coupled to a pulse bus and to receive at least one pulse signal from the pulse bus indicating the failure of at least one UPS coupled to the pulse bus. In one embodiment, the control circuitry is further configured to count a number of pulse signals received from the pulse bus and based on the number of pulse signals and the master priority index of the UPS, determine whether the UPS should be configured to operate in the master mode of operation. In another embodiment, a fourth one of the plurality of digital I/O's is configured to be coupled to a pulse bus and to provide a pulse signal to the pulse bus indicating the failure of the UPS.

According to one embodiment, the control circuitry is further configured to assign a unique time delay value to the UPS based on the master priority index of the UPS. In one embodiment, the control circuitry includes a counter having a value and is further configured to start the counter upon determining that no UPS coupled to the master bus is configured to operate in the master mode of operation.

According to another embodiment, the control circuitry is further configured to configure the UPS to operate in the master mode of operation upon determining that the value of the counter matches the unique time delay value of the UPS. In one embodiment, the control circuitry is one of a digital signal processor and a complex programmable logic device.

According to one aspect, the present invention features a UPS system comprising a plurality of UPS's coupled in parallel, each UPS including an input configured to receive input power from an input power source, an output configured to provide output power to a load, and means for determining whether any one of the plurality of UPS's is operating in a master mode of operation and in response to a determination that no UPS is operating in a master mode of operation, determining which first one the plurality of UPS's should be operating in the master mode of operation.

According to one embodiment, the UPS system further comprises means for determining whether the first one of the plurality of UPS's is capable of operating in the master mode of operation and in response to a determination that the first one of the plurality of UPS's is capable of operating in the master mode of operation, configuring the first one of the plurality of UPS's to operate in the master mode of operation.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, to provide enhanced scalability and/or redundancy, two or more UPS's may be electrically connected to form a single parallel UPS system with one output configured to be coupled to a load. In some typical parallel UPS systems, the UPS's may communicate with each other directly (e.g., via a bus) to manage their joint operation in the parallel UPS system. In such a system, before the parallel UPS system is able to operate, the UPS's may need to exchange initial startup information to define how the UPS's will interact. However, these initial startup communications may cause delay in the operation of the parallel UPS system, and may require complex communication circuitry in each UPS.

In other typical parallel UPS systems, the UPS's may utilize a master/controlled approach. In one master/controlled approach, a UPS is designated as a master UPS and the other UPS's are designated as controlled UPS's. The master UPS monitors the output voltage of its inverter (i.e., the output of the master UPS) and in response, generates an inverter current reference signal. Based on the inverter current reference signal, the master UPS controls the inverter to regulate its output. The master UPS also provides the inverter current reference signal to the controlled UPS's. The controlled UPS's share the load current based on the inverter current reference signal. Therefore, the master UPS controls the output of the entire parallel UPS system.

In a master/controlled approach, it is important to ensure that there is a master UPS designated at all times and that only one master UPS is designated at a time. If no master UPS is designated, the output voltage of the parallel UPS system will be uncontrolled which may result in output voltage interruption or an over voltage condition. Alternatively, if two UPS's are designated as master, the parallel UPS system may become unstable as both UPS's would try and maintain control of the system. Therefore, the identification of a master UPS is time critical, especially when the current master UPS has failed.

Common parallel UPS systems which implement a master/controlled approach often utilize a bus (e.g., a CAN bus) to facilitate a master UPS determination process between the UPS's of the parallel UPS system. However, while a communication bus may be useful to distribute non-time critical UPS information, as discussed above, communication buses alone may be too slow to achieve the required master determination performance. This may be especially true when more than two UPS's are coupled in parallel. Other common parallel UPS systems may implement different master/controlled approaches; however, these approaches often have a high number of digital Input/Output signals requiring complex logic circuitry in each UPS.

At least some embodiments described herein provided a parallel UPS system in which a plurality of UPS's, coupled in parallel, are capable of providing power to a load using a relatively simple, efficient and reliable master/controlled approach.

Figure 1A:
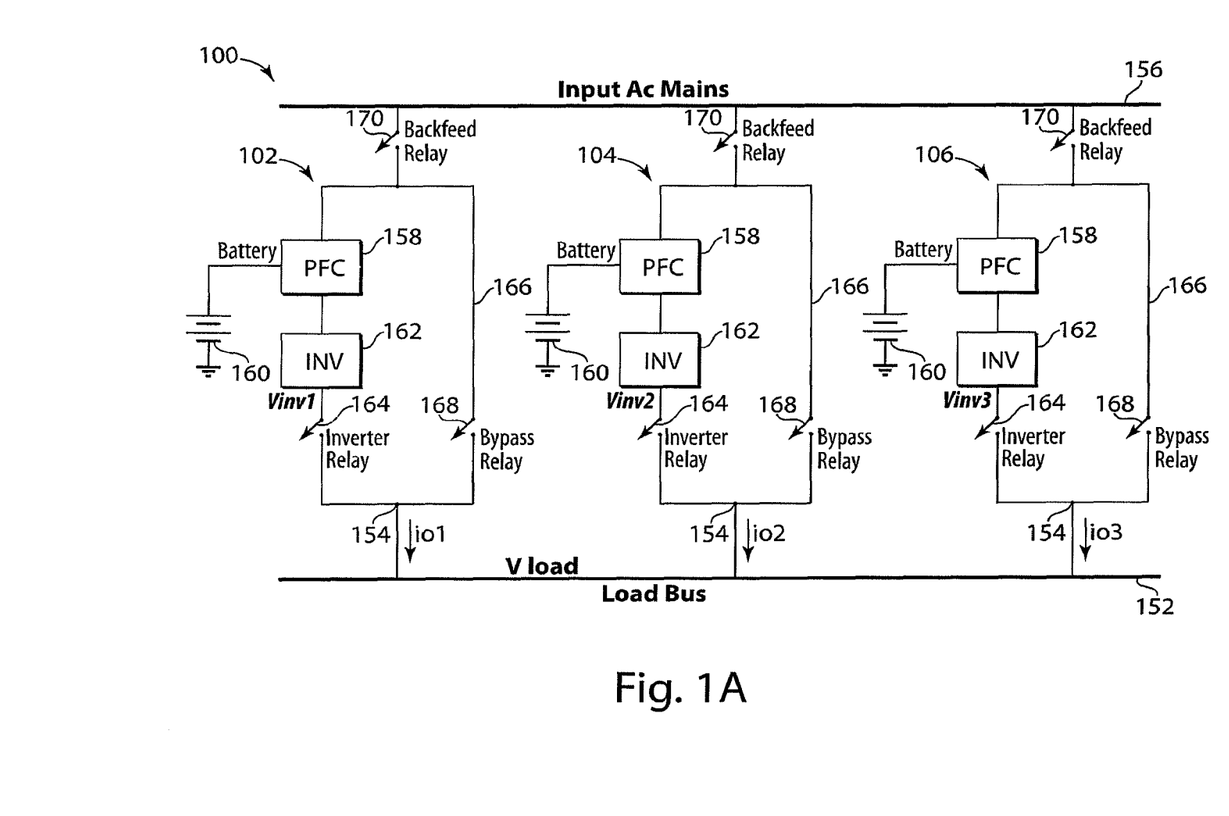
FIG. 1A is a block diagram of a parallel UPS system in accordance with aspects of the present invention.

FIG. 1A is a block diagram of a parallel UPS system 100 in accordance with aspects of the present invention. The parallel UPS system 100 includes a first UPS 102, a second UPS 104 and a third UPS 106, each coupled in parallel to provide power to a load bus 152 via a single output 154. In other embodiments, the UPS system 100 may include more or less than three UPS's. Each UPS 102, 104, 106 is coupled to input AC mains line 156. Within each UPS 102, 104, 106 a Power Factor Correction (PFC) circuit 158 is coupled to the AC mains line 156 and a battery 160. An inverter 162 is coupled to the PFC 158 and to the output 154 via an inverter relay 164. Each UPS 102, 104, 106 also includes a bypass line coupled between the input AC mains line 156 and the output 154 via a bypass relay 168. According to one embodiment, each UPS 102, 104, 106 also includes a backfeed relay 170 coupled to the input AC mains line 156 to provide backfeed protection.

Input AC power is provided by an external power source (e.g., a utility power source) to the input AC mains 156 and to each UPS 102, 104, 106. The PFC 158 of each UPS 102, 104, 106 converts the input AC power to DC power and provides the DC power to the inverter 162. According to one embodiment, where input AC power provided by the external power source is inadequate, each UPS 102, 104, 106 may instead receive DC power from a battery 160. The PFC 158 regulates the DC power from the battery and provides the DC power to the inverter 162.

The inverter 162 converts and regulates the received DC power into regulated AC power which is provided to the load bus 152. When regulation by the inverter 162 is not required or there is a problem with the inverter 162, unregulated power may be provided directly from the input AC mains line 156 to the output 154 via the bypass line 166. The inverter relay 164 and the bypass relay 168 are selectively controlled to determine whether each UPS 102, 104, 106 is operating regularly or in bypass mode.

According to one embodiment, the UPS 102, 104, 106 which is designated as the master UPS controls the output of each one of the controlled UPS's inverters 162 to ensure that appropriate power is provided to the load bus 152 from each UPS 102, 104, 106. Each UPS 102, 104, 160 includes circuitry capable of determining whether the UPS 102, 104, 106 should be designated as master UPS.

Figure 1B:
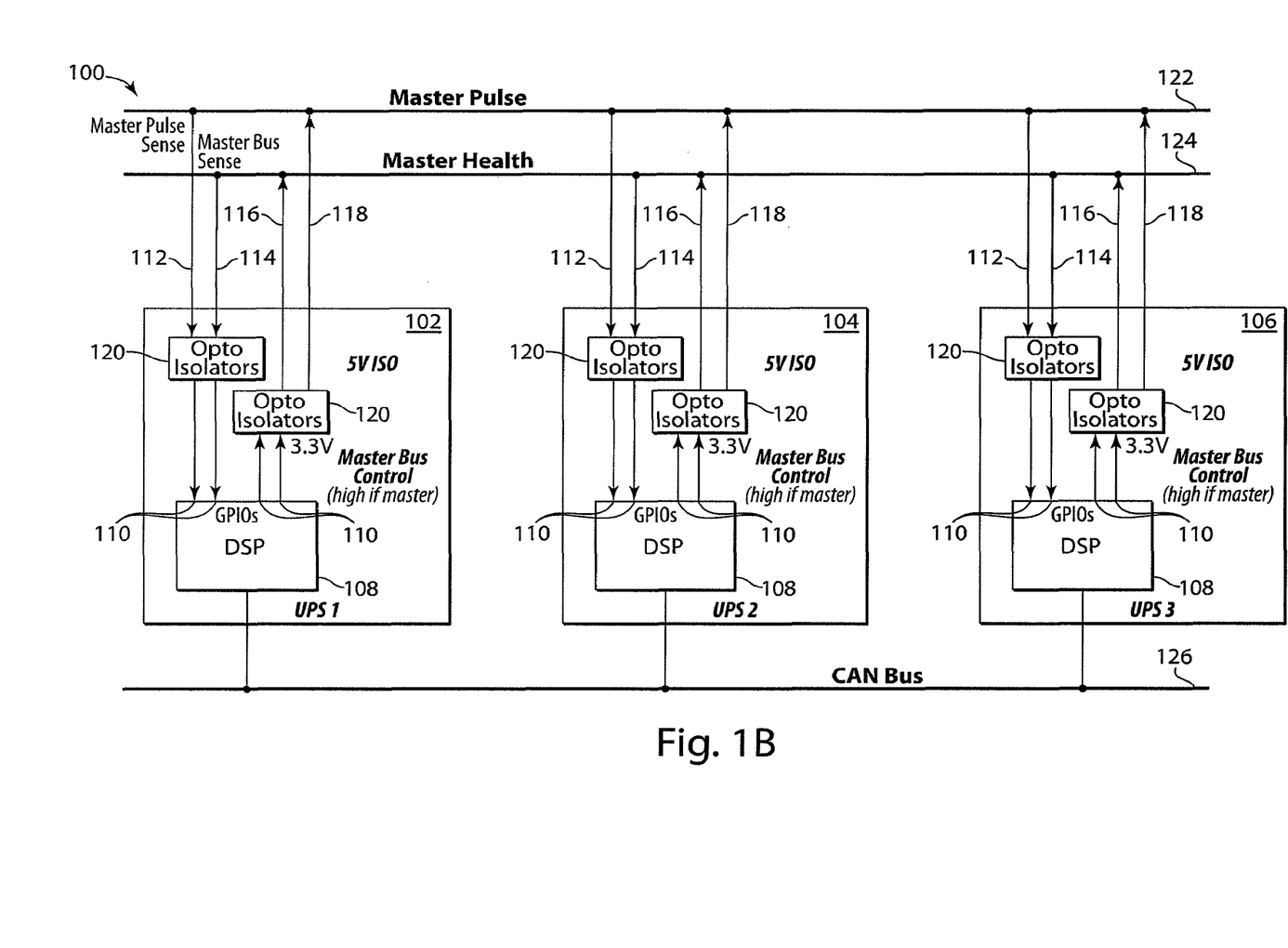
FIG. 1B is a block diagram of a parallel UPS system utilizing the pulse count method for master/controlled determination in accordance with aspects of the present invention.

For example, as shown in FIG. 1B, each UPS 102, 104, 106 includes a Digital Signal Processor 108 having a plurality of General Purpose Input/Outputs (GPIO) 110. Each DSP 108 is also coupled to a CAN bus 126.

Upon being powered up, each UPS 102, 104, 106 within the parallel UPS system 100 is assigned a unique identifier by the DSP 108. According to one embodiment, each unique identifier is based on the CAN bus address of the UPS 102, 104, 106; however, in other embodiments, the unique identifiers may be defined differently. Also, while the parallel UPS system is operating, a new UPS coupled to the parallel UPS system 100 is also assigned a unique identifier before it is allowed to participate in load sharing.

Based on the unique identifier, each DSP 108 calculates a master selection priority index for its corresponding UPS 102, 104, 106. According to one embodiment, additional system parameters of each UPS may also be used in calculating the master priority indexes. For example, a UPS with a specific configuration may be assigned a higher master priority index. According to one embodiment, a UPS having an available bypass mode may be assigned a higher master priority index then a UPS without an available bypass mode. According to another embodiment, a healthy UPS may be assigned a higher master priority index than a failed UPS. According to another embodiment, a UPS having a battery may be assigned a higher master priority index that a UPS without a battery When an initial master UPS determination is performed upon startup, or the next master UPS is determined after the failure of the current designated master UPS, the next master UPS is selected as the UPS having the highest master priority index that is also healthy. Embodiments described herein provide a parallel UPS system in which the next master UPS is determined based on the master priority indexes of each UPS, without the need for slow communications over the CAN bus 126 or complex logic.

FIG. 1B illustrates one embodiment of a master/controlled determination scheme based on the master priority indexes. Within each UPS 102, 104, 106 a first GPIO 110 is coupled to a master pulse bus 122 via a master pulse sense line 112, a second GPIO 110 is coupled to a master health bus 124 via a master health sense line 114, a third GPIO 110 is coupled to the master health bus 124 via a master health control line 116, and a fourth GPIO 110 is coupled to the master pulse bus 122 via a master pulse control line 118. According to one embodiment, each sense line 112, 116 and each control line 114, 118 includes an opto-isolator 120 configured to isolate each UPS from the master pulse bus 122 and the master health bus 124 to prevent ground loop problems.

Upon being assigned a master priority index, each UPS periodically shares its master priority index with the other UPS's coupled in parallel via the CAN bus 126. In this way, each UPS 102, 104, 106 tracks the master priority index of the other UPS's in the parallel UPS system.

Each one of the UPS's 102, 104, 106, regardless of whether the UPS is designated as the master UPS or a controlled UPS, is capable of controlling the master pulse bus 122, while only the master UPS is capable of controlling the master health bus 124. If a master UPS is operating properly, the master UPS sets the master health bus 124 high. If the master UPS fails, or if no UPS is currently designated as a master UPS, the master health bus 124 is set low. Upon seeing the master health bus 124 low, the UPS with the highest master priority index attempts to take over as the master UPS. If the UPS with the highest master priority index is capable of becoming the master UPS, it sets the master health bus 124 high, indicating that a UPS is designated as master UPS, and begins to control the output of the parallel UPS system 100.

If the UPS with the highest master priority index fails, the master health bus 124 is set low and the UPS with the next highest master priority index attempts to become the master UPS. If the UPS with the next highest master priority index is healthy and able to take over as master UPS, it sets the master health bus 124 high, indicating that a UPS is designated as master UPS, and begins controlling the output of the parallel UPS system 100. However, if the next highest master priority index also fails, the UPS sends a pulse on the master pulse bus 122, indicating that the UPS with the next highest master priority index has failed and the master health bus 124 remains low.

The remaining UPS's coupled to the master health bus 122 continue to recognize the low state of the master health bus 124 and each successive UPS having the next highest master priority index attempts to become master UPS. If the UPS fails, it sends a pulse on the master pulse bus 122. This continues until the UPS with the highest master priority index that is healthy takes over as the master UPS and the master health bus 122 is set high.

By counting the number of pulses on the master pulse bus 122, each UPS is able to determine which UPS's with a higher priority index have failed. For example, when a UPS recognizes that the number of sensed pulses matches the number of UPS's that have a higher priority index (excluding the UPS with the highest master priority index) than its own, the UPS recognizes that it is its turn to become master UPS and if healthy, it sets the master health bus high and takes over as the master UPS.

According to one embodiment, if a UPS has failed but is unable to send a pulse on the master pulse bus 122, the UPS with the next highest master priority index will assume that the UPS with the next higher priority index has failed after a predetermined period of time of not receiving a pulse on the master pulse bus 122 from the failed UPS and still seeing the master health bus 124 low.

Figure 2:
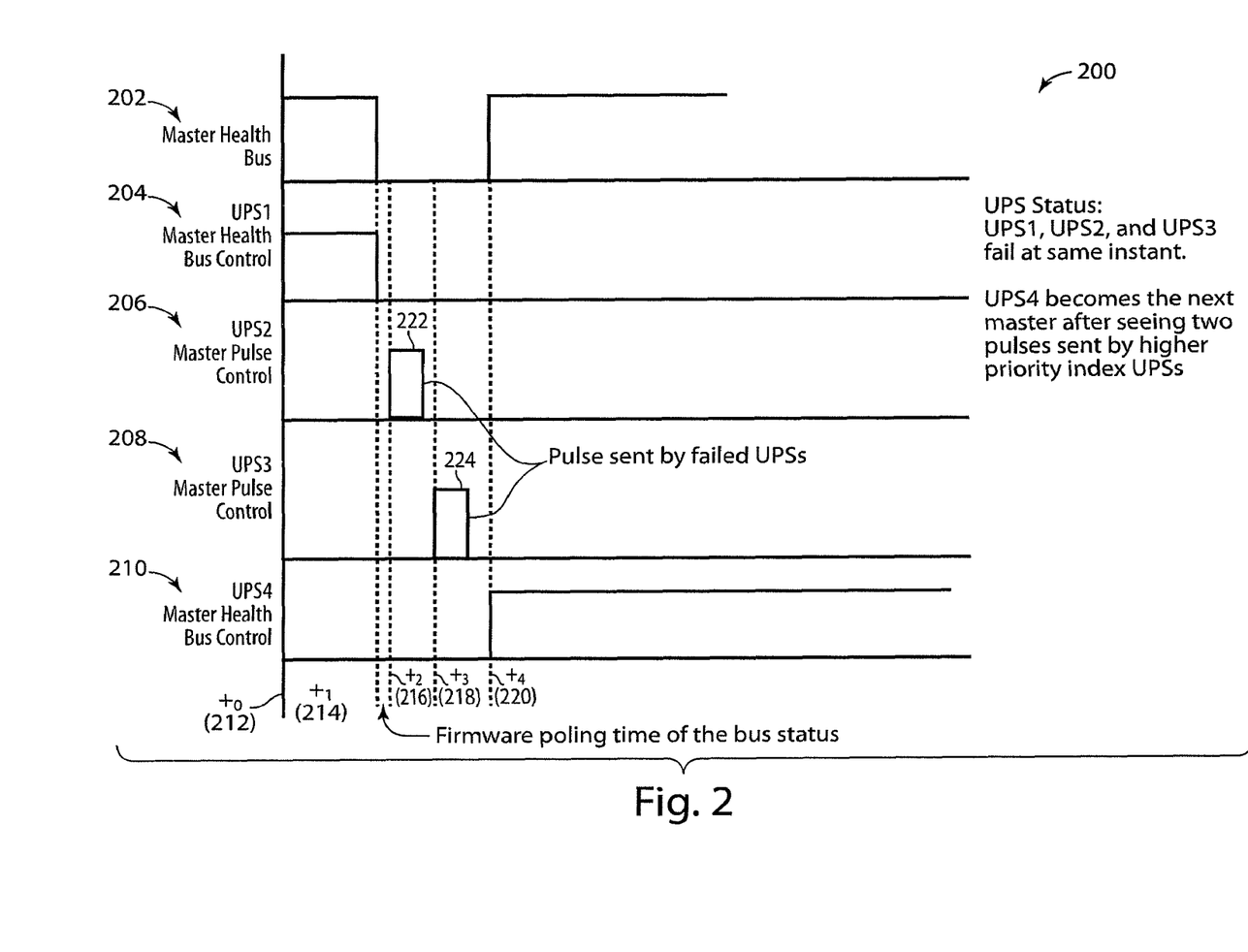
FIG. 2 is a timing diagram of a parallel UPS system utilizing the pulse count method for master/controlled determination in accordance with aspects of the present invention.

FIG. 2 is a timing diagram 200 illustrating the pulse count method utilized by a parallel UPS system as described above. The timing diagram 200 illustrates master health bus signals 202, master health bus control signals from a first UPS 204 having a master priority index of three, master pulse control signals from a second UPS 206 having a master priority index of two, master pulse control signals from a third UPS 208 having a master priority index of one, and master health bus control signals from a fourth UPS 210 having a master priority index of zero.

At time $t_0$ 212, the first UPS, having the highest master priority index, is healthy and is operating as master UPS. As a result, the master health bus control signal from the first UPS 204 is high resulting in the master health bus signal 202 also being high. At time $t_1$ 214, the first UPS fails and is unable to operate as master UPS. The master health bus control signal from the first UPS 204 is set low, causing the master health bus signal 202 to also be set low.

At time $t_2$ 216, the UPS with the next highest master priority index, the second UPS with master priority index three, sees that the master health bus signal 202 is low. However, as the second UPS has also failed, it sends a pulse 222 on the master pulse bus 122, indicating that is has failed and cannot take over as master UPS.

At time $t_3$ 218, the third UPS, seeing that the master health bus signal 202 is low and having counted one previous pulse on the master pulse bus 122 indicating that the one other UPS (i.e. the second UPS) having a higher master priority index (excluding the original failed master) has failed, recognizes that it is the UPS with the next highest master priority index and should take over as master UPS. However, as the third UPS has also failed (e.g., due to a common problem with the second UPS), instead it sends a pulse 224 on the master pulse bus 122, indicating that it has failed.

At time $t_4$ 220, the fourth UPS, seeing that the master health bus signal 202 is low and having counted two previous pulses on the master pulse bus 122 indicating that the two other UPS's (i.e. the second UPS and third UPS) having a higher master priority index (excluding the original failed master) have failed, recognizes that it is the UPS with the next highest master priority index and should take over as master UPS. As the fourth UPS is healthy, it takes over as master UPS, and sets its master health bus control 210 high, causing the master health bus signal 202 to also go high, indicating that a healthy master UPS is operating.

As discussed above, each UPS periodically communicates with the other UPS's (e.g. via the CAN bus 126) to maintain a table of the master priority indexes assigned to each UPS. In addition, each UPS may also communicate the master/controlled status of each UPS along with the health of each UPS. The master priority indexes are utilized by each UPS to determine how many UPS's have a higher master priority index (i.e. how many pulses the UPS should be looking for to know that the UPS should take over as master).

Figure 3:
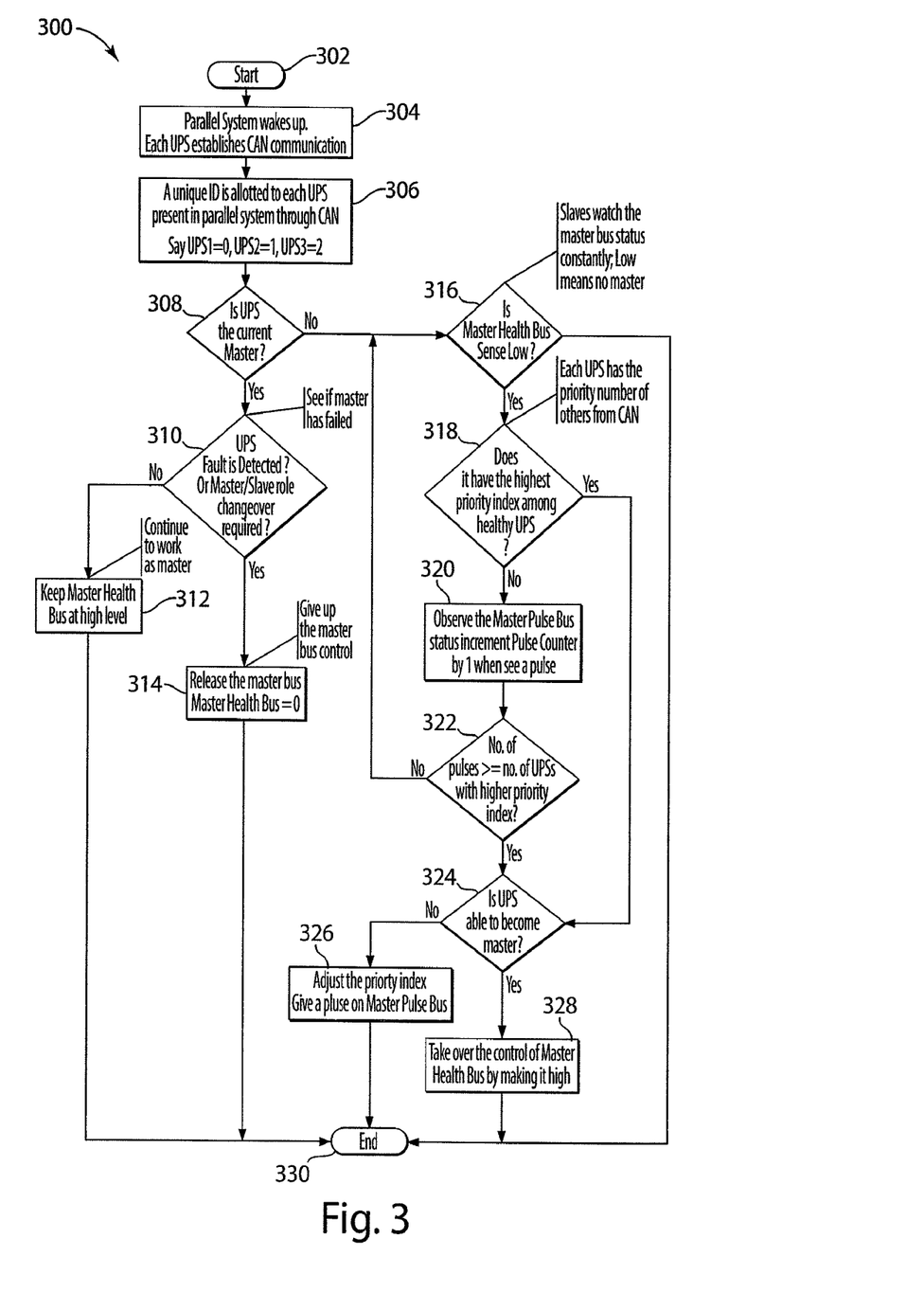
FIG. 3 is a flow chart illustrating a pulse count method master/controlled determination process in accordance with aspects of the present invention.

FIG. 3 is a flow chart 300 illustrating one embodiment of the pulse method master/controlled determination process. At block 302, the parallel UPS system is powered up. At block 304, the parallel UPS system wakes up and each UPS establishes CAN communication on the CAN bus 126. At block 306, a unique identifier is assigned to each UPS present in the parallel system. In one example, each UPS is assigned a unique identifier based on its CAN address. Based on the unique identifier and potentially other system parameters, each UPS is assigned a master priority index.

At block 308, a determination is made whether the UPS with the highest master priority index is operating as the current master UPS. If the UPS is operating as the master UPS, the master health bus 124 is high and at block 310, the UPS is monitored for failure. For example, the UPS is monitored for a fault or for a condition requiring a master/controlled role changeover. If the UPS remains healthy, then at block 312 the UPS continues to operate as the master UPS and the master health bus remains at a high level. However, if a fault is detected in the UPS, at block 314 the master health bus 124 is set low and the UPS releases control of the master health bus 124.

At block 308, if a determination is made that the UPS with the highest master priority index is not operating as the current master UPS, then a determination is made at block 316 whether the master health bus 124 is low, indicating no UPS is currently operating as master.

At block 318, in response to a determination at block 316 that the master health bus 124 is low, a determination is made whether the UPS with the next highest master priority index out of the healthy UPS's is identified.

At block 320, in response to the UPS with the next highest master priority index not being identified, each UPS monitors the master pulse bus 122 for pulse signals indicating UPS failures. When a pulse signal is received, a pulse counter in each UPS is incremented by one.

At block 322, the controlled UPS's determine which UPS has the next highest priority index by counting the number of received pulses and determining how many UPS's with a higher master priority index have failed. As a result, the UPS with the next highest priority index that is capable of becoming the master UPS is identified. However, if the UPS with the next highest priority index remains unidentified, the process returns to block 316.

At block 324, in response to the identification of the UPS with the next highest master priority index at block 318 or 322, a determination is made whether the UPS with the next highest master priority index is capable of operating as master UPS. At block 326, in response to a determination that the UPS with the next highest master priority index is unable to become master, the maser health bus remains low and a pulse is sent on the master pulse bus 122. At block 328, in response to a determination that the UPS with the next highest master priority index is able to become master, the UPS takes over the parallel UPS system as master and the master health bus 124 goes high. At block 330, the pulse method master/controlled process is terminated.

By only requiring each UPS to monitor the status of the master health bus 124 and count pulses on the master pulse bus 122, the master/controlled determination is performed quickly, without having to rely on the slow CAN bus 126 and any complex logic.

Figure 4:
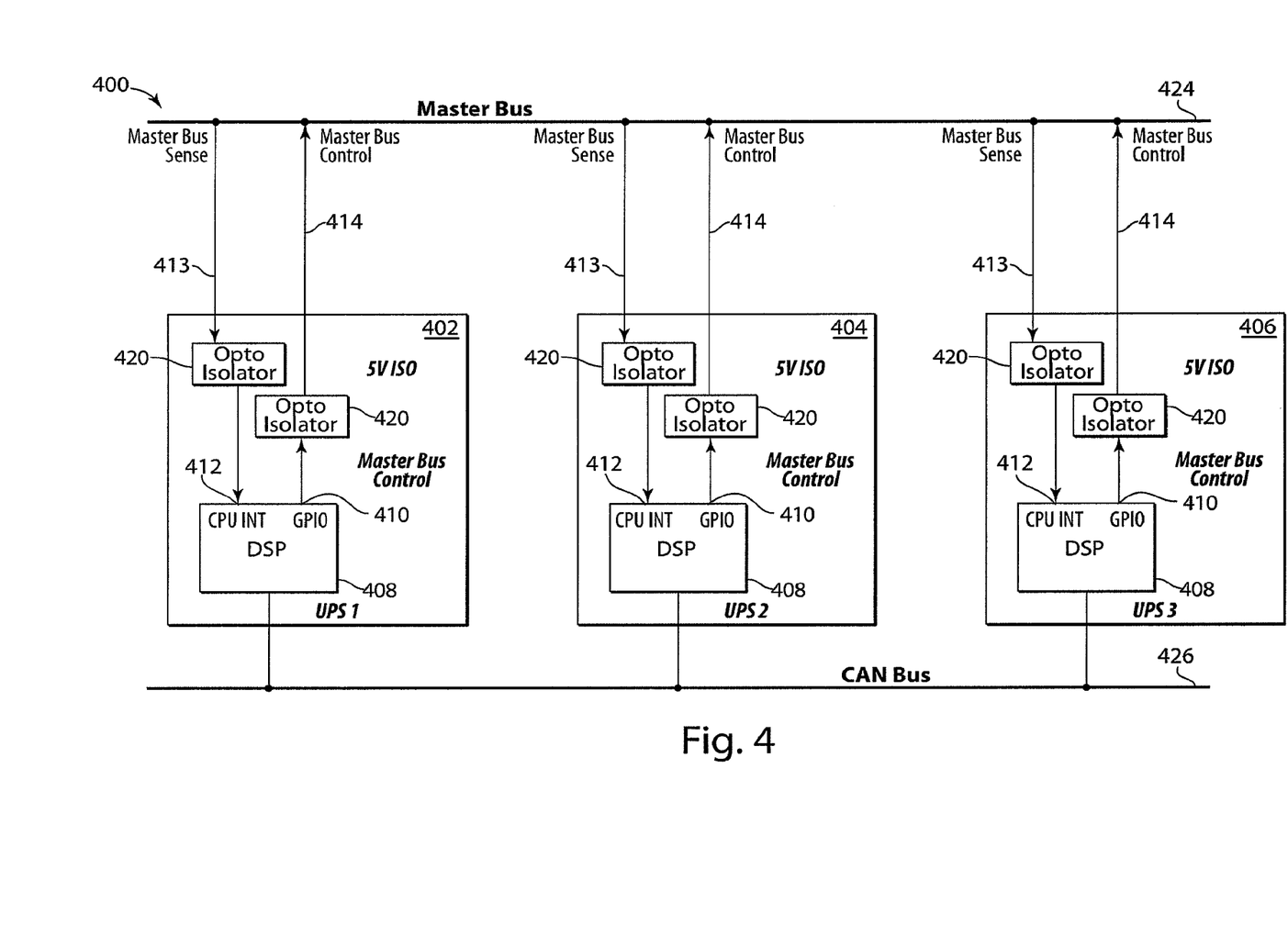
FIG. 4 is a block diagram of a parallel UPS system utilizing the DSP interrupt method for master/controlled determination in accordance with aspects of the present invention.

FIG. 4 illustrates another embodiment of a master/controlled determination scheme based on the master priority indexes. FIG. 4 is a block diagram of a parallel UPS system 400 in accordance with aspects of the present invention. The parallel UPS system 400 includes a first UPS 402, a second UPS 404 and a third UPS 406, each coupled in parallel to provide power to a load via a single output. In other embodiments, the UPS system 400 may include more or less than three UPS's. Each UPS 402, 404, 406 includes a Digital Signal Processor 408 having General Purpose Input/Outputs (GPIO) 410 and a CPU Interrupt 412. Each DSP 408 is also coupled to a CAN bus 426.

Within each UPS 402, 404, 406 the GPIO 410 is coupled to a master bus 424 via a master bus control line 414 and the CPU interrupt is coupled to the master bus 424 via a master bus sense line 413. According to one embodiment, the sense line 413 and the control line 414 each include an opto-isolator 420 configured to isolate each UPS from the master bus 424 and prevent ground loop problems.

As described above, upon powering up, each UPS 402, 404, 406 is assigned a unique identifier (e.g., from its CAN bus 426 address). Based on the unique identifier and other system parameters, a master priority index is calculated for each UPS 402, 404, 406. When an initial master UPS determination is required upon startup, or the next master UPS is determined after the failure of the current designated master UPS, the next master UPS is selected as the UPS having the highest master priority index that is also healthy.

In addition to a master priority index, each UPS 402, 404, 406 is also assigned a unique dead time delay which is computed based on the master priority index in each UPS. Once the mater priority indexes and unique dead time delays are assigned, the CPU interrupt 412 is enabled.

At startup of the system 400, no master UPS is selected and the master bus 424 is low. The UPS 402, 404, 406 with the highest master priority index becomes the master UPS and the master bus 424 is set high.

The UPS 402, 404, 406 which is designated as master UPS controls the master bus 424. When a current master UPS is designated, the master UPS sets the master bus 424 high, indicating that a healthy master UPS is operating. The status of the master bus 424 is fed to the CPU interrupt 412 of each UPS 402, 404, 406 in the system 400 via the master bus sense line 413.

If the current master UPS fails, the master bus 424 transfers from high to low. At the falling edge of the master bus 424 (i.e., at almost the instant when the master bus 424 transfers from high to low), the CPU interrupt 412 of each UPS 402, 404, 406 is triggered, indicating to each UPS 402, 404, 406 at substantially the same time that the master UPS has failed. Within the DSP 408 of each UPS 402, 404, 406, firmware of an Interrupt Service Routine (ISR) recognizes that the CPU interrupt 412 has been triggered and enables a software interrupt which utilizes a base counter and a compare register. The compare register is loaded with the UPS's unique dead time delay and the base counter is started.

The software interrupt of a UPS 402, 404, 406 is triggered when the master bus 424 is still low (i.e. indicating that the software interrupt in another UPS has not been triggered) and the value of the associated base counter matches the value of the unique dead time delay loaded in the compare register. The UPS 402, 404, 406 in which the software interrupt occurs first becomes the next master if it is able (i.e.

healthy). If the UPS 402, 404, 406 in which the software interrupt occurs is healthy and is designated as the master UPS, the UPS sets the master bus 424 high via the master bus control 414 to indicate to the other UPS's that a master UPS has been selected and that they can reset their software interrupt and base counter.

Figure 5:
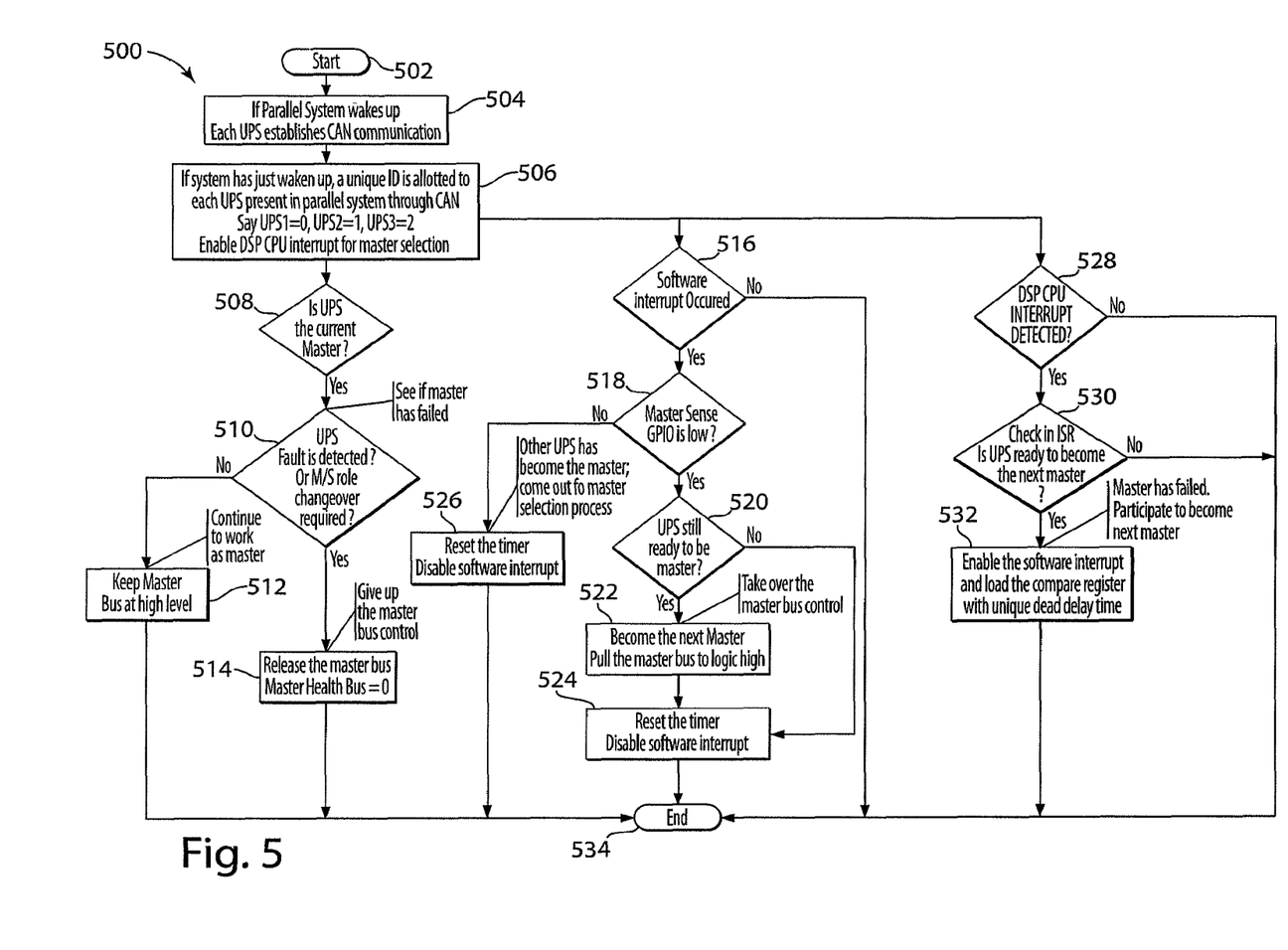
FIG. 5 is a flow chart illustrating a DSP interrupt method master/controlled determination process in accordance with aspects of the present invention.

FIG. 5 is a flow chart 500 illustrating a DSP interrupt method master/controlled determination process. At block 502, the parallel UPS system 400 is powered up. At block 504, the parallel UPS system 400 wakes up and each UPS establishes CAN communication on the CAN bus 426. At block 506, a unique identifier is assigned to each UPS present in the parallel system. In one example, each UPS is assigned a unique identifier based on its CAN address. Based on the unique identifier and potentially other system parameters, each UPS is assigned a master priority index. Based on the master priority index, each UPS is assigned a unique dead time delay. Upon being assigned a unique identifier, master priority index and unique dead delay time, the CPU interrupt 412 of each UPS is enabled.

At block 508, a determination is made whether the UPS with the highest master priority index is operating as the current master UPS. If the UPS is operating as the master UPS, the master bus 424 is high and at block 510, the UPS is monitored for failure. For example, the UPS is monitored for a fault or for a condition requiring a master/controlled role changeover. If the UPS remains healthy, then at block 512 the UPS continues to operate as the master UPS and the master bus 424 remains at a high level. However, if a fault is detected in the UPS, at block 514 the master bus 424 is set low and the UPS releases control of the master bus 424.

At block 528, a determination is made whether the CPU interrupt of each UPS 402, 404, 406 has been triggered. The CPU interrupt of each UPS is triggered when the master bus 424 transfers from high to low, indicating that the current master UPS has failed. In response to a determination that the CPU interrupt has been triggered, at block 530 a determination is made whether there are other controlled UPS's capable of becoming the master UPS. In response to a determination that there are other UPS's capable of being designated master, at block 532, the software interrupt of each UPS 402, 404, 406 is enabled, the compare register is loaded with the unique dead time delay and the base counter is started.

At block 516, a determination is made whether a software interrupt of a UPS 402, 404, 406 has been triggered. The software interrupt of a UPS is triggered when the value of the base counter of the UPS matches the value of the unique dead time delay stored in the compare register. This indicates to the UPS that no other UPS with a higher master priority index has been able to be designated UPS, as this would have stopped the base counter before it reached the dead time delay value.

At block 518, a determination is made, via the master bus sense line 413, whether the master bus 424 is still low. If the master bus 424 has gone high, then another UPS has intervened to be designated master and at block 526, the software interrupt is disabled and the base counter is reset. If the master bus 424 remains low, then at block 520 a determination is made whether the UPS is ready to be designated master. In response to a determination that the UPS is not ready to be designated master (e.g., because the UPS has failed), then at block 524, the software interrupt is disabled and the base counter is reset. In response to a determination that the UPS is healthy and is ready to be designated master, at block 522 the UPS is designated as master UPS and the master bus 424 is set high by the master bus control line 414. At block 524, the software interrupt of the master UPS is disabled and the base counter is reset. At block 534 the DSP interrupt method master/control determination process is completed.

In a DSP interrupt method master/controlled determination process, each UPS monitors the single master bus 424 to control its own CPU and software interrupts. It is not necessary for each UPS to directly communicate with the other UPS's regarding their master priority indexes and states. Each UPS is capable of independently determining whether it should be designated as master UPS, and as a result, the master/controlled determination is performed quickly and efficiently using minimal signals and logic.

Figure 6:
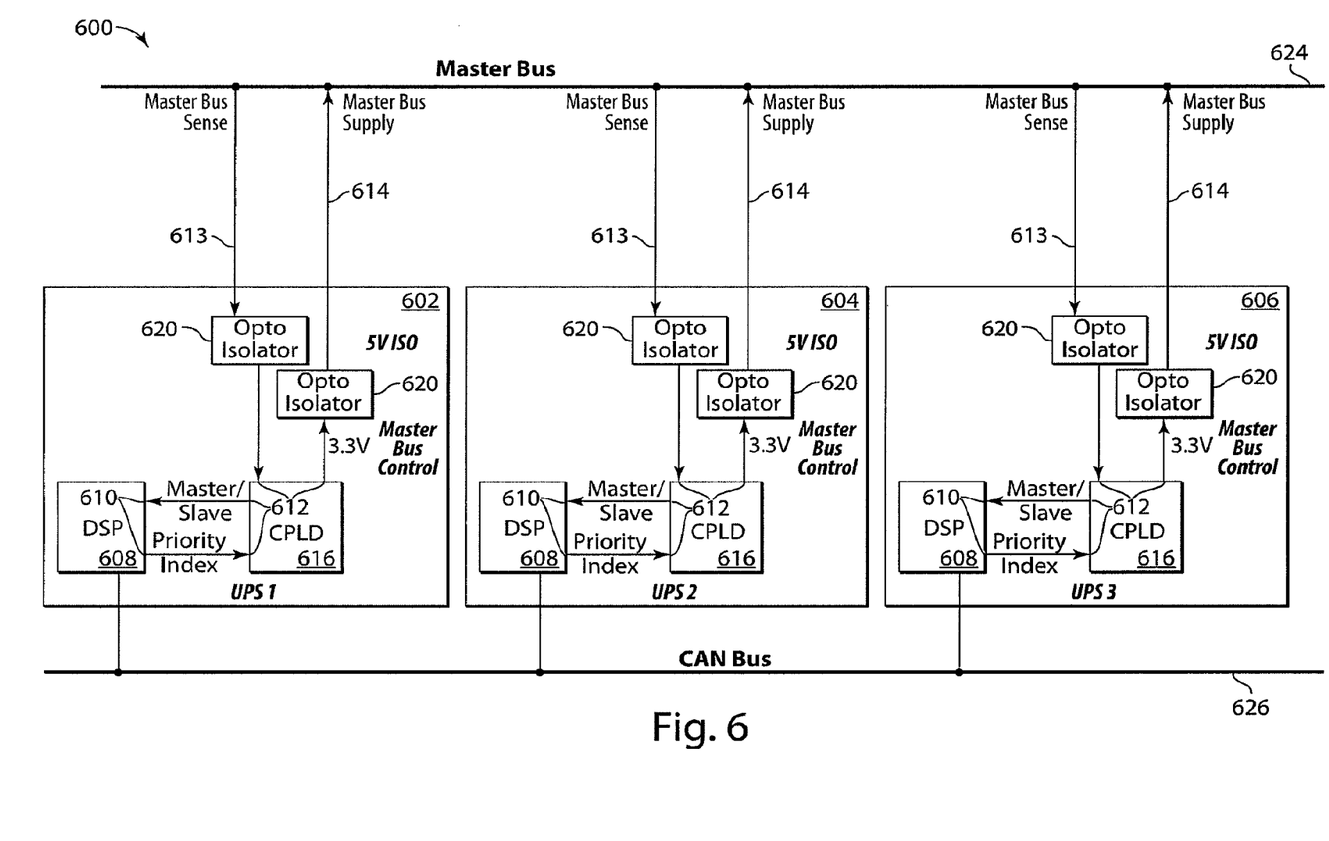
FIG. 6 is a clock diagram of a parallel UPS system utilizing the CPLD interrupt method for master/controlled determination in accordance with aspects of the present invention.

FIG. 6 illustrates another embodiment of a master/controlled determination scheme based on the master priority indexes. FIG. 6 is a block diagram of a parallel UPS system 600 in accordance with aspects of the present invention. The parallel UPS system 600 includes a first UPS 602, a second UPS 604 and a third UPS 606, each coupled in parallel to provide power to a load via a single output. In other embodiments, the UPS system 600 may include more or less than three UPS's. Each UPS 602, 604, 606 includes a Digital Signal Processor 608 having a plurality of General Purpose Input/Outputs (GPIO) 610 and a Complex Programmable Logic Device (CPLD) 616 also having a plurality of GPIO's 612. Each DSP 608 is also coupled to a CAN bus 626.

Within each UPS 602, 604, 606 the GPIO's 610 of the DSP 608 are coupled to the GPIO's 612 of the CPLD 616. Also within each UPS 602, 604, 606, a GPIO 612 of the CPLD 616 is coupled to a master bus 624 via a master bus control line 614 and another GPIO 612 of the CPLD 616 is coupled to the master bus 624 via a master bus sense line 613. According to one embodiment, the sense line 613 and the control line 614 each include an opto-isolator 620 configured to isolate each UPS from the master bus 624 and prevent ground loop problems.

As described above, upon powering up, each UPS 602, 604, 606 is assigned a unique identifier (e.g., from its CAN bus 626 address). Based on the unique identifier and other system parameters, a master priority index is calculated for each UPS 602, 604, 606 by the DSP 608. When an initial master UPS determination is required upon startup, or the next master UPS is determined after the failure of the current designated master UPS, the next master UPS is selected as the UPS having the highest master priority index that is also healthy. In addition to a master priority index, each UPS 602, 604, 606 is also assigned a unique dead time delay which is computed by the DSP 608 based on the master priority index of each UPS.

The DSP 608 of each UPS 602, 604, 606 provides the corresponding master priority index and the unique dead time delay to the CPLD 616 via a GPIO 610 of the DSP 608 and a GPIO 612 of the CPLD. According to one embodiment, the CPLD 616 of each USP 602, 604, 606 provides the current master/controlled status of the corresponding UPS to the DSP 608 via a GPIO 612 of the CPLD 616 and a GPIO 610 of the DSP 608.

The operation of the CPLD interrupt method master/controlled determination process is similar to the DSP interrupt method master/controlled determination process except that the master/controlled determination algorithm is performed by the CPLD 616, rather than the DSP 608.

Upon powering up the parallel UPS system 600, no master UPS is designated and the master bus 624 is set low. When the UPS with the highest master priority index becomes the master UPS, the master bus 624 is set high, indicating to the other UPS's that a master UPS is selected and operating properly.

Each controlled UPS monitors the master bus 624 via the master bus sense line 613. When the master bus 624 goes low, the UPS's sense, almost simultaneously, that the current master UPS has failed. Upon failure of the master UPS, the CPLD 616 of each UPS 602, 604, 606 starts a delay counter. When the master bus 624 is low and value of the delay counter matches the unique dead time delay of a UPS, the UPS with the matching unique dead time delay takes over as master UPS and sets the master bus 624 to high. When the master bus 624 goes high, the other UPS's know that a new master UPS has been selected and the CPLD's 616 can stop incrementing and reset their counters.

Figure 7:
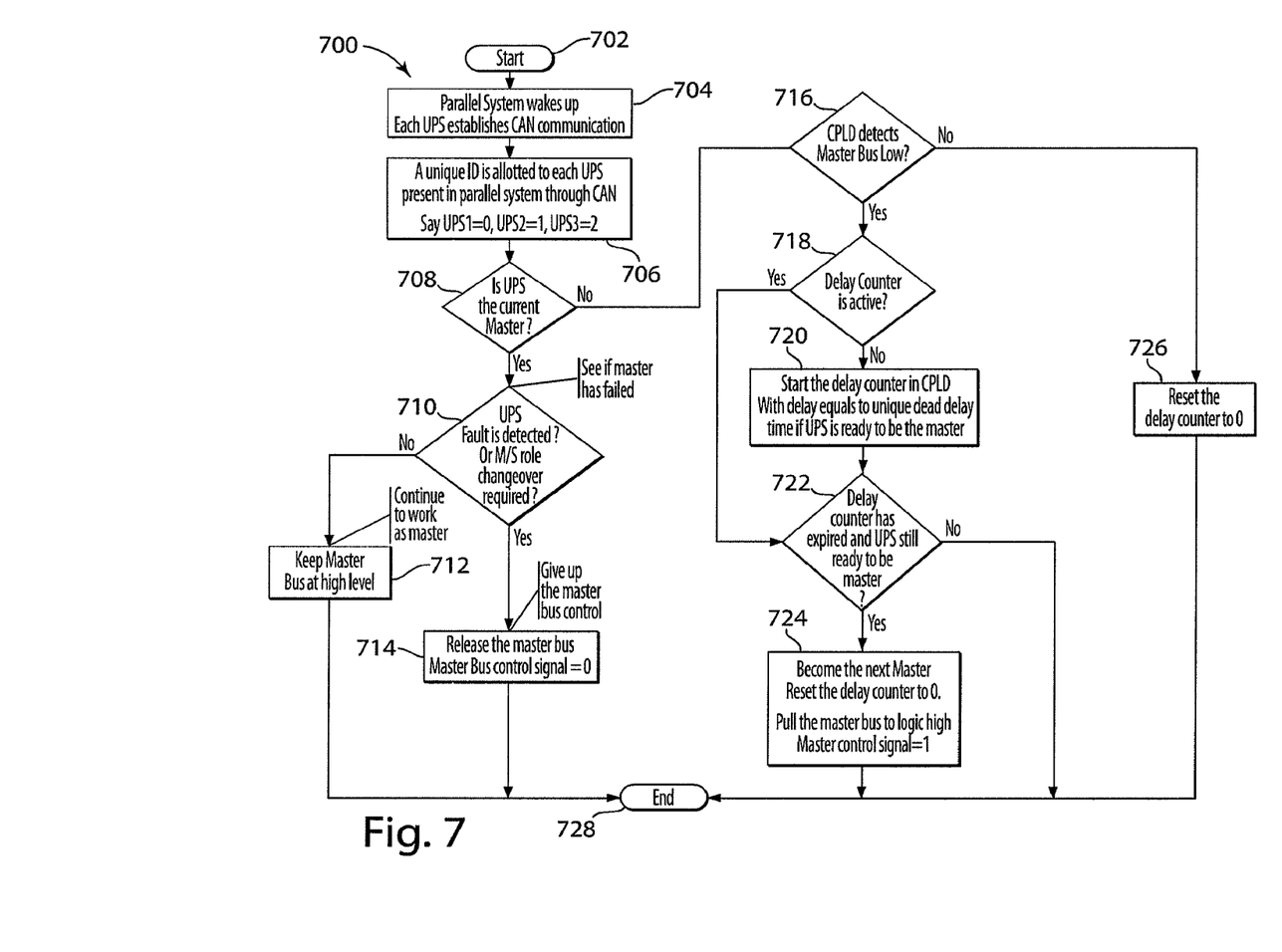
FIG. 7 is a flow chart illustrating a CPLD interrupt method master/controlled determination process in accordance with aspects of the present invention.

FIG. 7 is a flow chart 700 illustrating a CPLD interrupt method master/controlled determination process. At block 702, the parallel UPS system 600 is powered up. At block 704, the parallel UPS system 400 wakes up and each UPS establishes CAN communication on the CAN bus 626. At block 706, a unique identifier is assigned to each UPS present in the parallel system. In one example, each UPS is assigned a unique identifier based on its CAN address. Based on the unique identifier and potentially other system parameters, each UPS is assigned a master priority index. Based on the master priority index, each UPS is assigned a unique dead time delay.

At block 708, a determination is made whether the UPS with the highest master priority index is operating as the current master UPS. If the UPS is operating as the master UPS, the master bus 624 is high and at block 710, the master UPS is monitored for failure. For example, the UPS is monitored for a fault or for a condition requiring a master/controlled role changeover. If the UPS remains healthy, then at block 712 the UPS continues to operate as the master UPS and the master bus 624 remains at a high level. However, if a fault is detected in the UPS, at block 714 the master bus 624 is set low and the UPS releases control of the master bus 624.

In response to a determination that the UPS with the highest master priority index is not operating as master UPS, at block 716 a determination is made whether the CPLD 616 senses the master bus 624 low via the master bus sense line 613. At block 718, in response to a determination that the CPLD 616 has sensed that the master bus 624 is low (i.e., indicating no UPS is operating as master), a determination is made whether a delay counter of the CPLD 616 is active.

In response to a determination that the delay counter of the CPLD 616 is not active, at block 720 the delay counter of the CPLD is started. In response to a determination that the delay counter of the CPLD 616 is already active or after the delay counter has been started, at block 722, a determination is made whether the value of the delay counter equals the unique dead time delay of a UPS.

Once it is determined by a UPS that the delay counter equals the unique dead time delay of the UPS, the delay counter matching UPS attempts to become the next master UPS. A determination is made whether the delay counter matching UPS is ready to be master (i.e., healthy). At block 724, in response to a determination that the UPS is ready to become master, the UPS is designated as the master UPS and the master bus 624 is set high, indicating to other UPS's that a master UPS is operating. When the CPLD 616 of each UPS detects that the master bus 624 is set low, at block 726 the delay counter of the CPLD 616 is reset to zero.

In a CPLD interrupt method master/controlled determination process, each UPS must only monitor the single master bus 424 to match its own delay timer with a unique timer value. It is not necessary for each UPS to directly communicate with the other UPS's regarding their master priority indexes and states. Each UPS is capable of independently determining whether it should be designated as master UPS, and as a result, the master/controlled determination is performed quickly and efficiently using minimal signals.

Even though examples in accordance with the present invention are described herein with reference to the use of three UPS's in a parallel UPS system, other examples may utilize more or less than three UPS's coupled together in parallel.

Even though examples in accordance with the present invention are described herein in reference to Uninterruptible Power Supplies (UPS), other examples may be utilized with any type of parallel power system in which more than one power source is desired to be coupled together and controlled effectively and efficiently. It also is to be appreciated that examples in accordance with the present invention may be utilized to monitor any type (e.g., commercial or residential) or size system.

By providing a parallel UPS system in which a plurality of UPS's, coupled in parallel, utilize master priority indexes to make a master/controlled UPS determination, the parallel UPS system is capable of providing power to a load using a relatively simple, efficient and reliable master/controlled approach without the need for slow CAN bus communications or complex logic.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a UPS system having a plurality of UPS's, the method comprising:
   powering on the UPS system;
   assigning each one of the plurality of UPS's a unique identifier;
   calculating a master priority index for each one of the plurality of UPS's based on the unique identifier of each one of the plurality of UPS's; and
   based on the master priority index of each one of the plurality of UPS's, configuring each one of the plurality of UPS's to operate in one of a master mode of operation and a controlled mode of operation.

2. The method of claim 1, wherein assigning includes assigning a unique identifier to each one of the plurality of UPS's based on a CAN bus address of each one of the plurality of UPS's.

3. The method of claim 1, further comprising:
   sensing whether any one of the plurality UPS's is operating in the master mode of operation; and
   in response to sensing that no UPS is operating in the master mode of operation, determining which one of the plurality of UPS's should be configured to operate in the master mode of operation.

4. The method of claim 3, wherein the act of determining which one of the plurality of UPS's should be configured to operate in the master mode of operation comprises:
   determining whether a first UPS of the plurality of UPS's is capable of operating in the master mode of operation; and
   in response to a determination that the first UPS is not capable of operating in the master mode of operation, sending a pulse signal from the first UPS to each one of the plurality of UPS's indicating that the first UPS has failed.

5. The method of claim 4, further comprising:
   receiving at least one pulse signal at each one of the plurality of UPS's;
   counting a number of received pulse signals; and
   determining, based on the number of received pulse signals and the master priority index of each one of the plurality of UPS's, which one of the plurality of UPS's should be designated as master UPS.

6. The method of claim 5, further comprising:
   determining, based on the number of received pulse signals and the master priority index of a second UPS, that the second UPS should be designated as master UPS;
   determining whether the second UPS is capable of operating in the master mode of operation;
   in response to a determination that the second UPS is capable of operating in the master mode of operation, configuring the second UPS to operate in the master mode of operation; and
   in response to a determination that the second UPS is not capable of operating in the master mode of operation, sending a pulse signal from the second UPS to each one of the plurality of UPS's indicating that the second UPS has failed.

7. The method of claim 3, wherein determining which one of the plurality of UPS's should be configured to operate in the master mode of operation comprises:
   assigning a delay time, based on the master priority index of each UPS, to each one of the plurality of UPS's;
   incrementing a value of a counter in each one of the UPS's upon sensing that no UPS is configured to operate in the master mode of operation;
   sensing, at a first UPS, that the value of the first UPS's counter matches its assigned delay time; and
   configuring, in response to sensing that the value of the first UPS's counter matches its assigned delay time, the first UPS to operate in the master mode of operation.

8. A UPS comprising:
   an input configured to receive input power from an input power source;
   an output configured to provide output power to a load;
   a plurality of digital I/O's; and
   control circuitry coupled to the plurality of digital I/O's, the control circuitry configured to assign a unique identifier to the UPS, to calculate a master priority index of the UPS based on the unique identifier, and based on the master priority index and at least one signal provided by the plurality of digital I/O's, to configure the UPS to operate in one of a master and controlled modes of operation.

9. The UPS of claim 8, wherein the control circuitry is further configured to be coupled to a CAN bus, and wherein the unique identifier assigned to the UPS is based on a CAN address of the UPS.

10. The UPS of claim 8, wherein a first one of the plurality of digital I/O's is configured to be coupled to a master bus and to receive signals from the master bus indicating whether another UPS coupled to the master bus is operating in the master mode of operation.

11. The UPS of claim 10, wherein a second one of the plurality of digital I/O's is configured to be coupled to the master bus and to provide signals to the bus indicating whether the UPS is operating in the master mode of operation.

12. The UPS of claim 10, wherein in response to receiving signals at the first one of the plurality of digital I/O's indicating that no UPS coupled to the master bus is operating in the master mode of operation, the control circuitry is further configured to determine, based on signals received from the plurality of digital I/O's and its master priority index, whether the UPS should be configured to operate in the master mode of operation.

13. The UPS of claim 11, wherein a third one of the plurality of digital I/O's is configured to be coupled to a pulse bus and to receive at least one pulse signal from the pulse bus indicating the failure of at least one UPS coupled to the pulse bus.

14. The UPS of claim 13, wherein the control circuitry is further configured to count a number of pulse signals received from the pulse bus and based on the number of pulse signals and the master priority index of the UPS, determine whether the UPS should be configured to operate in the master mode of operation.

15. The UPS of claim 13, wherein a fourth one of the plurality of digital I/O's is configured to be coupled to the pulse bus and to provide a pulse signal to the pulse bus indicating the failure of the UPS.

16. The UPS of claim 10, wherein the control circuitry is further configured to assign a unique time delay value to the UPS based on the master priority index of the UPS.

17. The UPS of claim 16, wherein the control circuitry includes a counter having a value and is further configured to start the counter upon determining that no UPS coupled to the master bus is configured to operate in the master mode of operation.

18. The UPS of claim 17, wherein the control circuitry is further configured to configure the UPS to operate in the master mode of operation upon determining that the value of the counter matches the unique time delay value of the UPS.

19. The UPS of claim 8, wherein the control circuitry is one of a digital signal processor and a complex programmable logic device.

20. A UPS system comprising:
a plurality of UPS's coupled in parallel, each UPS including:
an input configured to receive input power from an input power source;
an output configured to provide output power to a load; and
means for determining whether any one of the plurality of UPS's is operating in a master mode of operation and in response to a determination that no UPS is operating in a master mode of operation, determining which first one the plurality of UPS's should be operating in the master mode of operation.

21. The UPS system of claim 20, further comprising means for determining whether the first one of the plurality of UPS's is capable of operating in the master mode of operation and in response to a determination that the first one of the plurality of UPS's is capable of operating in the master mode of operation, configuring the first one of the plurality of UPS's to operate in the master mode of operation.

* * * * *